United States Patent
Lin

(10) Patent No.: US 12,189,538 B2
(45) Date of Patent: Jan. 7, 2025

(54) METHOD AND APPARATUS FOR PERFORMING OPERATIONS TO NAMESPACES OF A FLASH MEMORY DEVICE

(71) Applicant: Silicon Motion, Inc., Hsinchu County (TW)

(72) Inventor: Sheng-Liu Lin, Hsinchu (TW)

(73) Assignee: SILICON MOTION, INC., Zhubei (TW)

(*) Notice: Subject to any disclaimer, the term of this patent is extended or adjusted under 35 U.S.C. 154(b) by 0 days.

(21) Appl. No.: 17/690,800

(22) Filed: Mar. 9, 2022

(65) Prior Publication Data

US 2022/0197818 A1 Jun. 23, 2022

Related U.S. Application Data

(62) Division of application No. 16/164,252, filed on Oct. 18, 2018, now Pat. No. 11,307,992.

(Continued)

(30) Foreign Application Priority Data

Aug. 24, 2018 (CN) .......................... 201810970872.9

(51) Int. Cl.
*G06F 12/1009* (2016.01)
*G06F 12/109* (2016.01)

(52) U.S. Cl.
CPC ........ *G06F 12/1009* (2013.01); *G06F 12/109* (2013.01); *G06F 2212/1044* (2013.01)

(58) Field of Classification Search
CPC ............... G06F 12/1009; G06F 12/109; G06F 2212/7201; G06F 12/0246

(Continued)

(56) References Cited

U.S. PATENT DOCUMENTS 9,696,935 B2 * 7/2017 Hashimoto ........... G06F 3/0659
10,764,180 B1 * 9/2020 Klein .................. H04L 61/5007
(Continued)

FOREIGN PATENT DOCUMENTS

CN 106255967 A 12/2016
CN 106484587 A 3/2017
(Continued)

OTHER PUBLICATIONS

Taiwanese Office Action and Search Report for Taiwanese Application No. 107129704, dated Jun. 6, 2019, with partial English translation.

*Primary Examiner* — Yaima Rigol
*Assistant Examiner* — Edward Waddy, Jr.
(74) *Attorney, Agent, or Firm* — Birch, Stewart, Kolasch & Birch, LLP

(57) ABSTRACT

The invention introduces a method for performing operations to namespaces of a flash memory device, by a processing unit of a storage device, at least including the steps: receiving a cross-namespace data-movement command from a host, requesting to move user data of a first logical address of a first namespace to a second logical address of a second namespace; cutting first physical address information corresponding to the first logical address of a first logical-physical mapping table corresponding to the first namespace; and storing the first physical address information in an entry corresponding to a second logical address of a second logical-physical mapping table corresponding to the second namespace.

17 Claims, 16 Drawing Sheets

Related U.S. Application Data

(60) Provisional application No. 62/688,743, filed on Jun. 22, 2018.

(58) Field of Classification Search
USPC ........ 711/206, 202, 203, 205, 207, E12.014, 711/E12.001, E12.002
See application file for complete search history.

(56) References Cited

U.S. PATENT DOCUMENTS

| | | | |
|---|---|---|---|
| 2011/0246617 A1* | 10/2011 | Sheehan | G06F 9/54 709/219 |
| 2013/0212321 A1* | 8/2013 | Talagala | G06F 12/0246 711/103 |
| 2014/0281040 A1 | 9/2014 | Li | |
| 2015/0046670 A1* | 2/2015 | Kim | G06F 12/0246 711/207 |
| 2016/0342463 A1 | 11/2016 | Oshima | |
| 2017/0083434 A1 | 3/2017 | Potash | |
| 2017/0160988 A1 | 6/2017 | Nemoto et al. | |
| 2017/0351431 A1 | 12/2017 | Dewitt et al. | |
| 2018/0074839 A1 | 3/2018 | Pachlore et al. | |
| 2018/0095667 A1* | 4/2018 | Miller | G06F 3/0689 |
| 2018/0121344 A1* | 5/2018 | Seo | G06F 12/0246 |
| 2018/0217951 A1 | 8/2018 | Benisty et al. | |
| 2018/0260334 A1 | 9/2018 | Asano et al. | |
| 2019/0087089 A1* | 3/2019 | Yoshida | G06F 3/0616 |
| 2019/0129862 A1 | 5/2019 | Yoshida et al. | |
| 2019/0146907 A1* | 5/2019 | Frolikov | G06F 12/0246 711/103 |
| 2019/0208014 A1* | 7/2019 | Goldberg | G06F 16/128 |
| 2019/0227921 A1 | 7/2019 | Frolikov | |

FOREIGN PATENT DOCUMENTS

| | | |
|---|---|---|
| CN | 107273061 A | 10/2017 |
| CN | 107305606 A | 10/2017 |
| TW | 201818249 A | 5/2018 |
| TW | I622890 B | 5/2018 |

* cited by examiner

FIG. 10

| DW | Byte 3 | | | | | | | | Byte 2 | | | | | | | | Byte 1 | | | | | | | | Byte 0 | | | | | | | |
|---|---|---|---|---|---|---|---|---|---|---|---|---|---|---|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | | | | | | | | | | | | | | | | | | | | | | | | | | | | | Opcode 1510 | | | |
| 1 | Command ID 1530 | | | | | | | | | | | | | | | | Destination Namespace ID 1580 | | | | | | | | | | | | | | | |
| 2 | | | | | | | | | | | | | | | | | Source Namespace ID 1590 | | | | | | | | | | | | | | | |
| 3 | | | | | | | | | | | | | | | | | | | | | | | | | | | | | | | | |
| 4 | | | | | | | | | | | | | | | | | | | | | | | | | | | | | | | | |
| 5 | | | | | | | | | | | | | | | | | | | | | | | | | | | | | | | | |
| 6 | Start Destination Logical-block-number 1550 | | | | | | | | | | | | | | | | | | | | | | | | | | | | | | | |
| 7 | | | | | | | | | | | | | | | | | | | | | | | | | | | | | | | | |
| 8 | | | | | | | | | | | | | | | | | | | | | | | | | | | | | | | | |
| 9 | | | | | | | | | | | | | | | | | | | | | | | | | | | | | | | | |
| 10 | Start Source Logical-block-number 1560 | | | | | | | | | | | | | | | | | | | | | | | | | | | | | | | |
| 11 | | | | | | | | | | | | | | | | | | | | | | | | | | | | | | | | |
| 12 | | | | | | | | | | | | | | | | | | | | | | | | | | | | | | | | |
| 13 | | | | | | | | | | | | | | | | | | | | | | | | | | | | | | | | |
| 14 | Data-movement Quantity 1570 | | | | | | | | | | | | | | | | | | | | | | | | | | | | | | | |
| 15 | | | | | | | | | | | | | | | | | | | | | | | | | | | | | | | | |

METHOD AND APPARATUS FOR PERFORMING OPERATIONS TO NAMESPACES OF A FLASH MEMORY DEVICE

CROSS-REFERENCE TO RELATED APPLICATIONS

This is a Divisional application of and claims the benefit of priority to U.S. patent application Ser. No. 16/164,252, filed on Oct. 18, 2018, which claims the benefit of priority to U.S. Provisional Application Ser. No. 62/688,743, filed on Jun. 22, 2018; and Patent Application No. 201810970872.9, filed in China on Aug. 24, 2018; the entirety of which is incorporated herein by reference for all purposes.

BACKGROUND

The disclosure generally relates to storage devices and, more particularly, to method and apparatus for performing operations to namespaces of a flash memory device.

Flash memory devices typically include NOR flash devices and NAND flash devices. NOR flash devices are random access—a host accessing a NOR flash device can provide the device any address on its address pins and immediately retrieve data stored in that address on the device's data pins. NAND flash devices, on the other hand, are not random access but serial access. It is not possible for NOR to access any random address in the way described above. Instead, the host has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word. Actually, NAND flash devices usually read or program several pages of data from or into memory cells. In reality, the NAND flash device always reads from the memory cells and writes to the memory cells complete pages. After a page of data is read from the array into a buffer inside the device, the host can access the data bytes or words one by one by serially clocking them out using a strobe signal.

Namespace management commands of Non-Volatile Memory Express (NVMe) specification may be used to create and delete namespaces. In addition to the basic operations, users may require advance operations for increasing the length of a namespace or moving data across namespaces, or others. However, the specification does not support the advanced operations. Thus, it is desirable to have a method and an apparatus for performing the advance operations to namespaces of a flash memory device.

SUMMARY

In an aspect of the invention, a method for performing operations to namespaces of a flash memory device is introduced to include the steps: receiving a cross-namespace data-movement command from a host, requesting to move user data of a first logical address of a first namespace to a second logical address of a second namespace; cutting first physical address information corresponding to the first logical address of a first logical-physical mapping table corresponding to the first namespace; and storing the first physical address information in an entry corresponding to a second logical address of a second logical-physical mapping table corresponding to the second namespace.

In another aspect of the invention, a non-transitory computer program product for performing operations to namespaces of a flash memory device is introduced to include program code when being executed to realize the aforementioned method.

In still another aspect of the invention, an apparatus for performing operations to namespaces of a flash memory device is introduced to include: a random access memory (RAM), an access interface and a processing unit. The RAM is arranged to operably store a first logical-physical mapping table corresponding to a first namespace, and a second logical-physical mapping table corresponding to a second namespace. The processing unit is arranged to operably receive a cross-namespace data-movement command from a host, requesting to move user data of a first logical address of a first namespace to a second logical address of a second namespace; cut first physical address information corresponding to the first logical address of a first logical-physical mapping table corresponding to the first namespace; and store the first physical address information in an entry corresponding to a second logical address of a second logical-physical mapping table corresponding to the second namespace.

Both the foregoing general description and the following detailed description are examples and explanatory only, and are not restrictive of the invention as claimed.

BRIEF DESCRIPTION OF THE DRAWINGS

FIG. 10 is a schematic diagram of the data structure of a namespace update command according to an embodiment of the invention.

FIG. 14 is a schematic diagram of the data structure of a cross-namespace data-movement command according to an embodiment of the invention.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
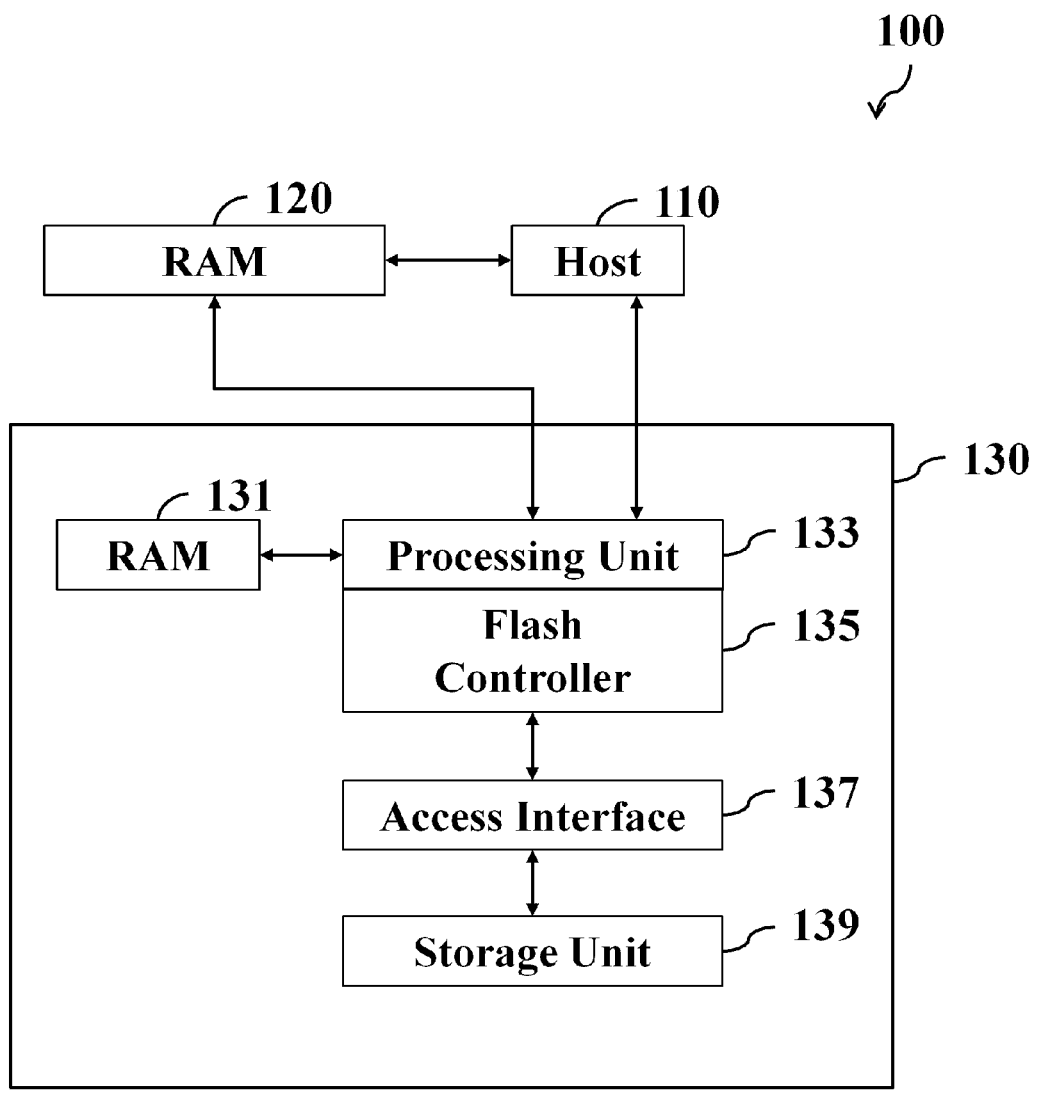
FIG. 1 is the system architecture of a flash memory according to an embodiment of the invention.

Refer to FIG. 1. The flash-memory system architecture 100 includes a host 110, a Random Access Memory (RAM) 120 and a storage device 130. The host 110 may create queues on demand for its operations. The system architecture may be practiced in a Personal Computer (PC), a laptop PC, a notebook, a mobile phone, a digital camera, a digital recorder, or other consumer electronic products. Specified regions of the RAM 120 may be allocated for data buffers, queues, or others, and storing device operation parameters, namespace variables, or others. The storage device may include a processing unit 133. The processing unit 133 may receive namespace management commands from the host 110 and instruct a flash controller 135 to increase a namespace size or capacity and move data across namespaces accordingly. The namespace size or capacity may be represented in a quantity of logical blocks and each logical block is assigned a logical block address. The quantity of logical blocks may be determined according to a formatted logical block address (LBA) size, such as 4 KB. In addition to user data, the logical block may further include metadata. The namespace size may indicate a total number of logical blocks of a particular namespace. For example, a namespace of size n consists of logical blocks addressed by LBA #0 to LBA #(n-1). The namespace capacity may indicate the maximum number of logical blocks that may be allocated in a particular namespace. The host 110 preferably employ NVMe protocol to communicate with processing unit 133. Any of the host 110 and the processing unit 133 may be implemented in numerous ways, for example, a general-purpose hardware, such as a single processor, multi-processors with parallel computation capacity, Graphical Processing Unit (GPU), or others with calculation capacity, and perform the recited functions when loading and executing relevant instructions, macrocode, microcode or others. The RAM 120 and 131 may store necessary data in execution, such as variables, data tables, or others.

The storage device 130 includes the flash controller 135, an access interface 137 and a storage unit 139 and the flash controller 135 may communicate with the storage unit 139 via the access interface 137, specifically, using a Double Data Rate (DDR) protocol, such as Open NAND Flash Interface (ONFI), DDR toggle, or others. The flash controller 135 of the storage device 130 writes user data into a designated address (a destination address) of the storage unit 139 and reads user data from a designated address (a source address) thereof through the access interface 137. The access interface 137 may use several electronic signals including a data line, a clock signal line and control signal lines for coordinating command and data transfer between the flash controller 135 and the storage unit 139. The data line may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc. The processing unit 133 and the flash controller 135 may be implemented in separate chips or integrated with a single chip.

Figure 2:
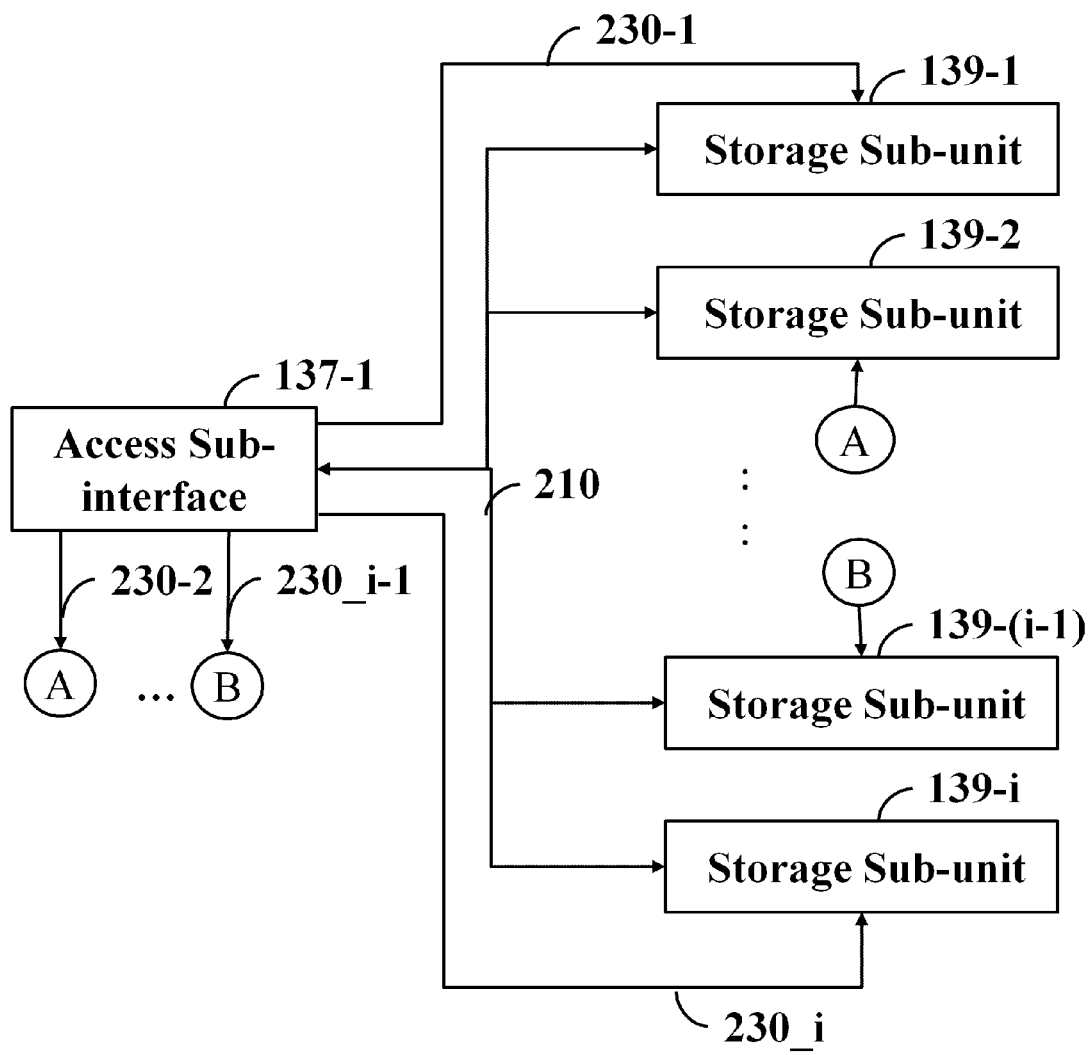
FIG. 2 is a schematic diagram illustrating multiple storage sub-units connecting to a single access sub-interface.

The storage unit 139 may contain multiple storage sub-units and each storage sub-unit may use a respective access sub-interface to communicate with the flash controller 135. One or more storage sub-units may be packaged in a single die. The storage device may contain j access sub-interfaces and each access sub-interface may connect to i storage sub-units. Each access sub-interface and the connected storage sub-units behind may be referred to as a I/O channel collectively and identified by a Logical Unit Number (LUN). That is, i storage sub-units may share the same access sub-interface. For example, assume that the storage device 130 contains 4 I/O channels and each I/O channel connects to 4 storage sub-units: The storage device 130 has 16 storage sub-units in total. The flash controller 135 may drive one of the access sub-interfaces to read data from the designated storage sub-unit. Each storage sub-unit has an independent CE control signal. That is, it is required to enable a corresponding CE control signal when attempting to perform data read or programming from or into a designated storage sub-unit via an associated access sub-interface. It is apparent that any number of I/O channels may be provided in the storage device 130, and each I/O channel may include any number of storage sub-units, and the invention should not be limited thereto. Refer to FIG. 2. The flash controller 135, through the access sub-interface 137-1, may use independent CE control signals 230-1 to 230-i to select one of the connected storage sub-units 139-1 and 139-i, and then read data from or program data into the designated location of the selected storage sub-unit via the shared data line 210.

Figure 3:
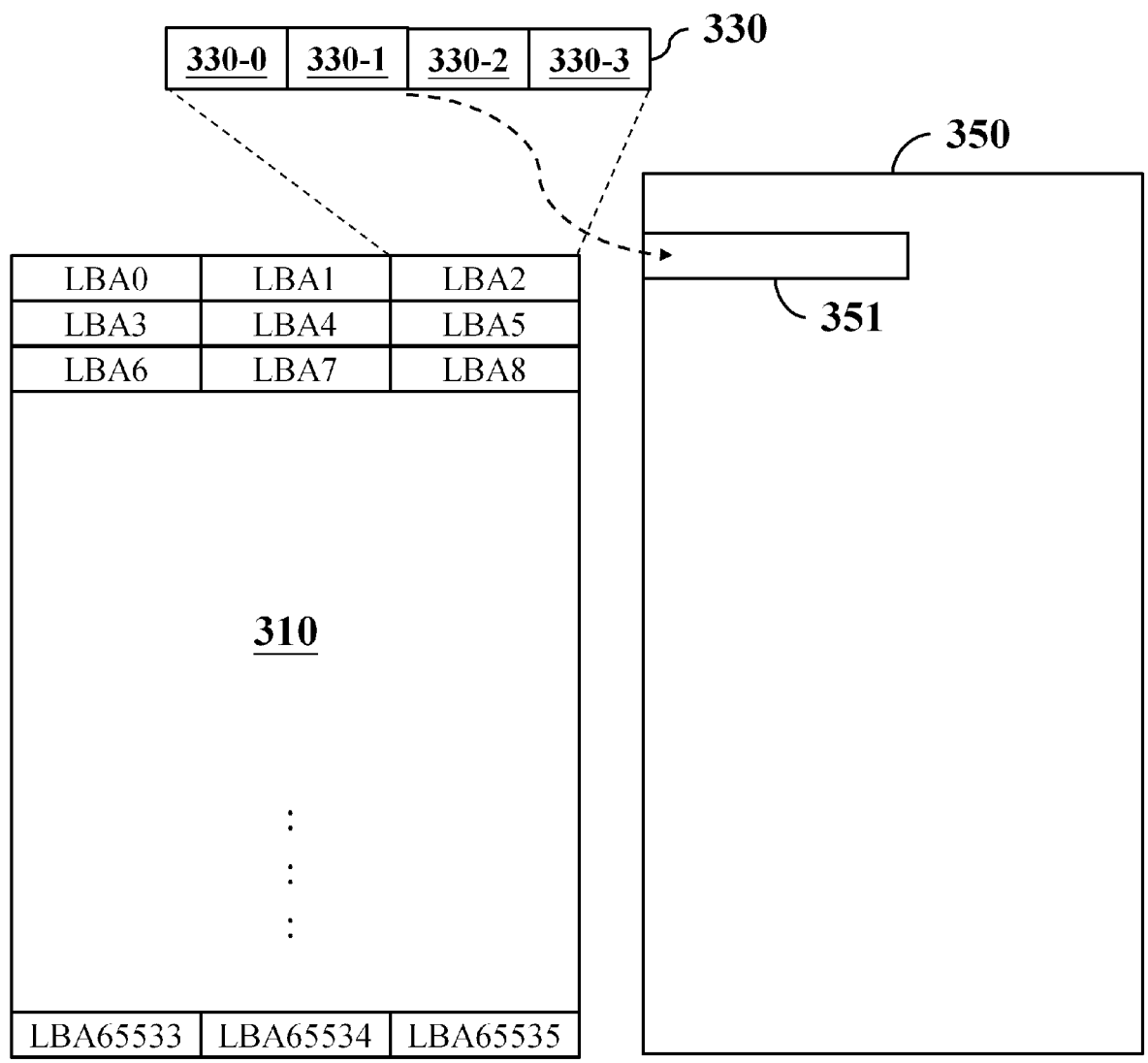
FIG. 3 is a schematic diagram of physical storage mappings.

Refer to FIG. 3. The logical-physical mapping table 310 may store physical address information corresponding to each logical address (or LBA) preferable in sequence. The occupied space of the logical-physical mapping table 310 is directly proportional to a total number of logical addresses preferably. Each logical address may be represented by an LBA and each LBA maps to a fixed length of physical storage space. For example, the logical-physical mapping table 310 sequentially stores physical address information from LBA #0 to LBA #65535. Data of several continuous logical addresses (such as LBA #0 to LBA #7) may form a host page. The physical address information 330 may be represented by four bytes: the first byte 330-0 records a (physical) block number, the second byte 330-1 records (physical) page number (and offset), the third byte 330-2 records a (physical) plane number and the last byte 330-3 records a LUN. For example, the physical address information 330 corresponding to LBA #2 points to a region 351 of a block 350.

Figure 4:
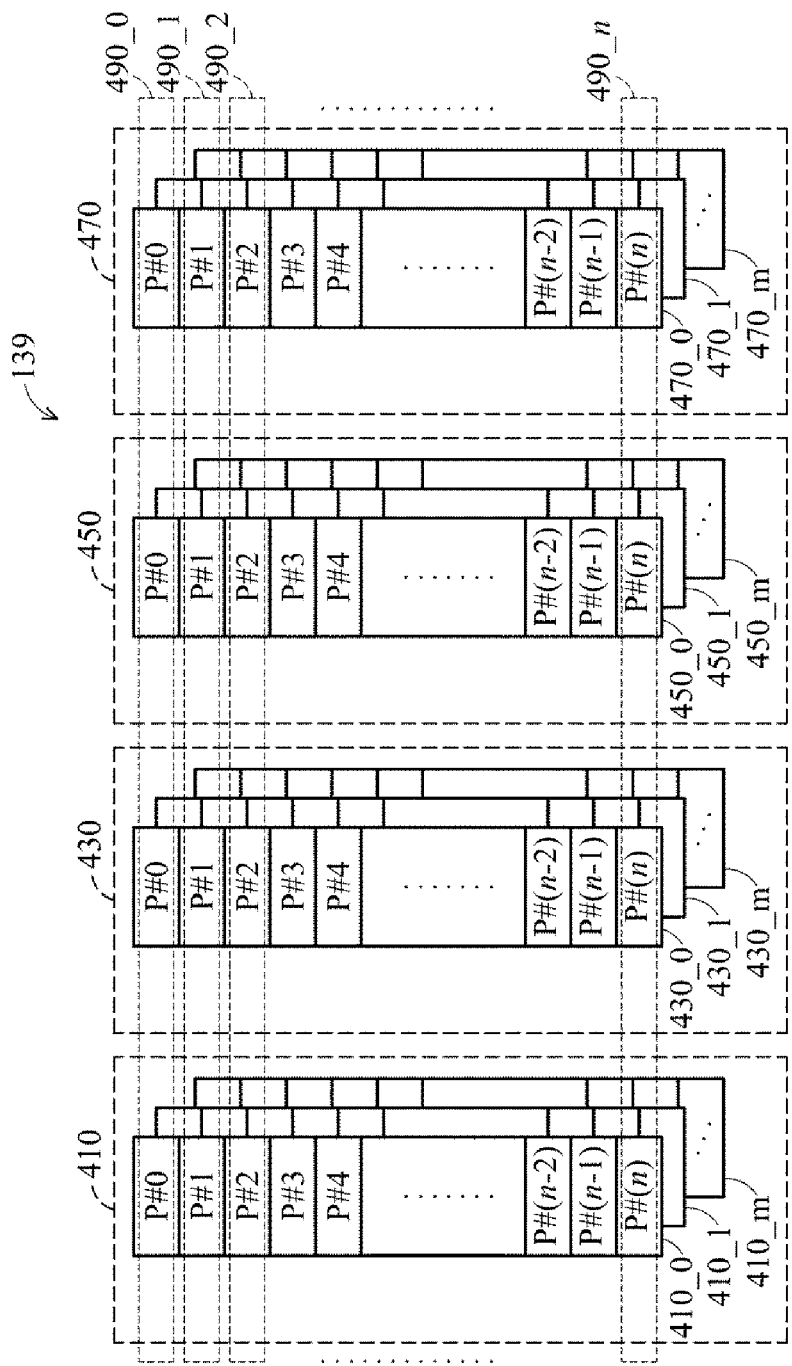
FIG. 4 is a schematic diagram of the data organization of a storage unit.

Refer to FIG. 4. The storage unit 139 may include multiple data planes 410_0 to 410_m, 430_0 to 430_m, 450_0 to 450_m and 470_0 to 470_m and each data plane or multiple data planes may be set to one LUN. The data planes 410_0 to 410_m and the shared access sub-interface are called the I/O channel 410, the data planes 430_0 to 430_m and the shared access sub-interface are called the I/O channel 430, the data planes 450_0 to 450_m and the shared access sub-interface are called the I/O channel 450, and the data planes 470_0 to 470_m and the shared access sub-interface are called the I/O channel 470, collectively, in which m may be a power of two 2^n, such as 2, 4, 8, 16, 32, etc., the I/O channels 410, 430, 450 and 470 may be identified by LUNs. Each of the data planes 410_0 to 470_m may include multiple physical blocks, each physical block may include multiple pages P #0 to P #(n) and each page may include multiple sectors, such as 4, 8 sectors, or more, where n may be set to 767, 1535, or others. Each page may include multiple NAND memory cells and the NAND memory cells may be Single-Level Cells (SLCs), Multi-Level Cells (MLCs), Triple-Level Cells (TLCs) or Quad-Level Cells (QLCs). In some embodiments, when each NAND memory cell is SLC capable of recording two states, the pages P #0 of the data planes 410_0 to 470_0 may virtually form a super page 490_0, the pages P #1 of the data planes 410_0 to 470_0 may virtually form a super page 490_1, and so on. In alternative embodiments, when each NAND memory cell is MLC capable of recording four states, one physical wordline may include pages P #0 (referred to as Most Significant Bit MSB pages) and pages P #1 (referred to as Least Significant Bit LSB pages), and the rest may be deduced by analogy. In alternative embodiments, when each NAND memory cell is TLC capable of recording eight states, one physical wordline may include pages P #0 (MSB pages), pages P #1 (referred to as Center Significant Bit CSB pages) and pages P #2 (LSB pages), and the rest may be deduced by analogy. In alternative embodiments, when each NAND memory cell is QLC capable of recording sixteen states, in addition to MSB, CSB and LSB pages, one physical wordline may further include Top Significant Bit (TSB) pages.

When the storage unit 139 operates, a page may be the minimum data unit, such as 4 KB, that can be managed or programmed, and the physical address may be represented by a page number. Alternatively, each page may include multiple sectors and the length of each sector may be, for example, 4 KB. A sector may be the minimum data unit that can be managed, and the physical address may be represented by a sector number or an offset that this sector is located in a page. Generally, a block is the minimum unit for erasing data.

Figure 5:
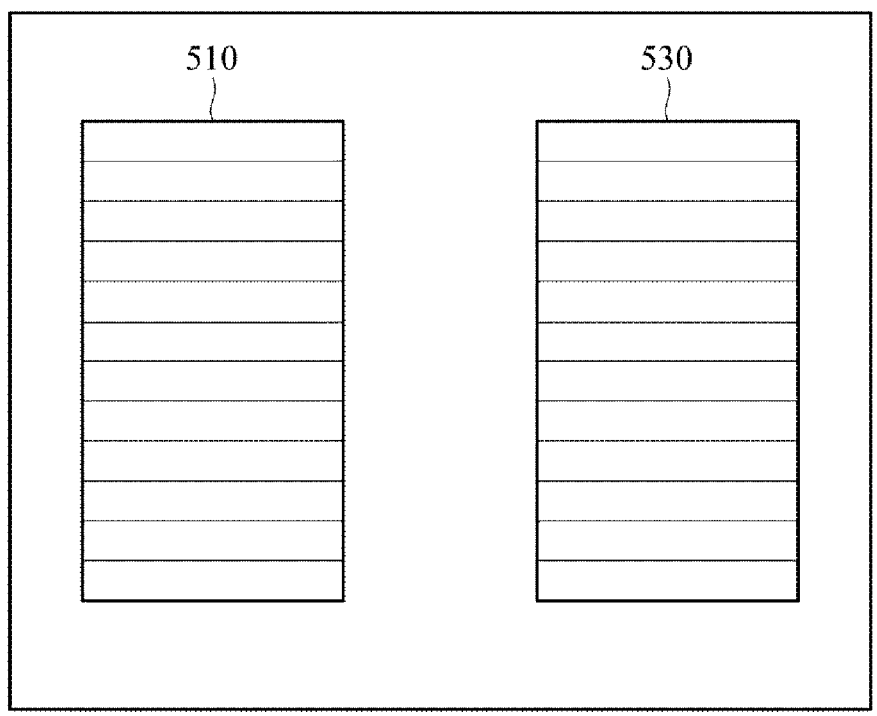
FIG. 5 is a schematic diagram of command queues.

Refer to FIG. 5. Queues may include a Submission Queue (SQ) 510 and a Completion Queue (CQ) 530 for temporarily storing host instructions and Completion Elements (CEs), respectively. The SQ 510 and the CQ 530 are preferably created in a single device, for example, a memory of a host or a memory of the storage device 130. The SQ 510 and the CQ 350 may be created in different devices. Each of the SQ 510 and the CQ 530 contains a collection of entries. Each entry of the SQ 510 may store one host command, for example, one administration command, such as an identify, an set feature, a namespace management or a namespace attach command, or other; or one I/O command (hereinafter referred to as a data access command), such as an erase, a read or a write command, or others. Although FIG. 5 shows two queues 510 and 530, those artisans may create two kinds of SQ 510: administration SQ and an I/O SQ for temporarily storing administration and data access commands, respectively. Similarly, those artisans may create two kinds of CQ 530: an administration CQ and an I/O CQ for storing CEs associated with administration and data access commands, respectively.

Each entry of the CQ 530 stores one CE associated with one data access or administration command, for reporting an execution result of the corresponding command, where the functionality of the CE acts like a confirmation message. The entries in the collection are kept in order. The principle operations on the collection are the addition of entities to the rear terminal position (or referred to as the tail), known as enqueue, and removal of entities from the front terminal position (or referred to as the head), known as dequeue, where the amount of entries that are enqueued or dequeued may be equal to or greater than 1. The first command or element added to the SQ 510 or the CQ 530 will be the first one to be removed. The host 110 may write administration and data access commands into the SQ 510 and the processing unit 133 may read (or fetch) the earliest arrived administration or data access command from the SQ 510 to execute. After an execution of the data access command has completed, the processing unit 133 may write a CE into the CQ 530 and the host 110 may read (or fetch) the CE to determine an execution result of the associated administration or data access command.

Figure 6:
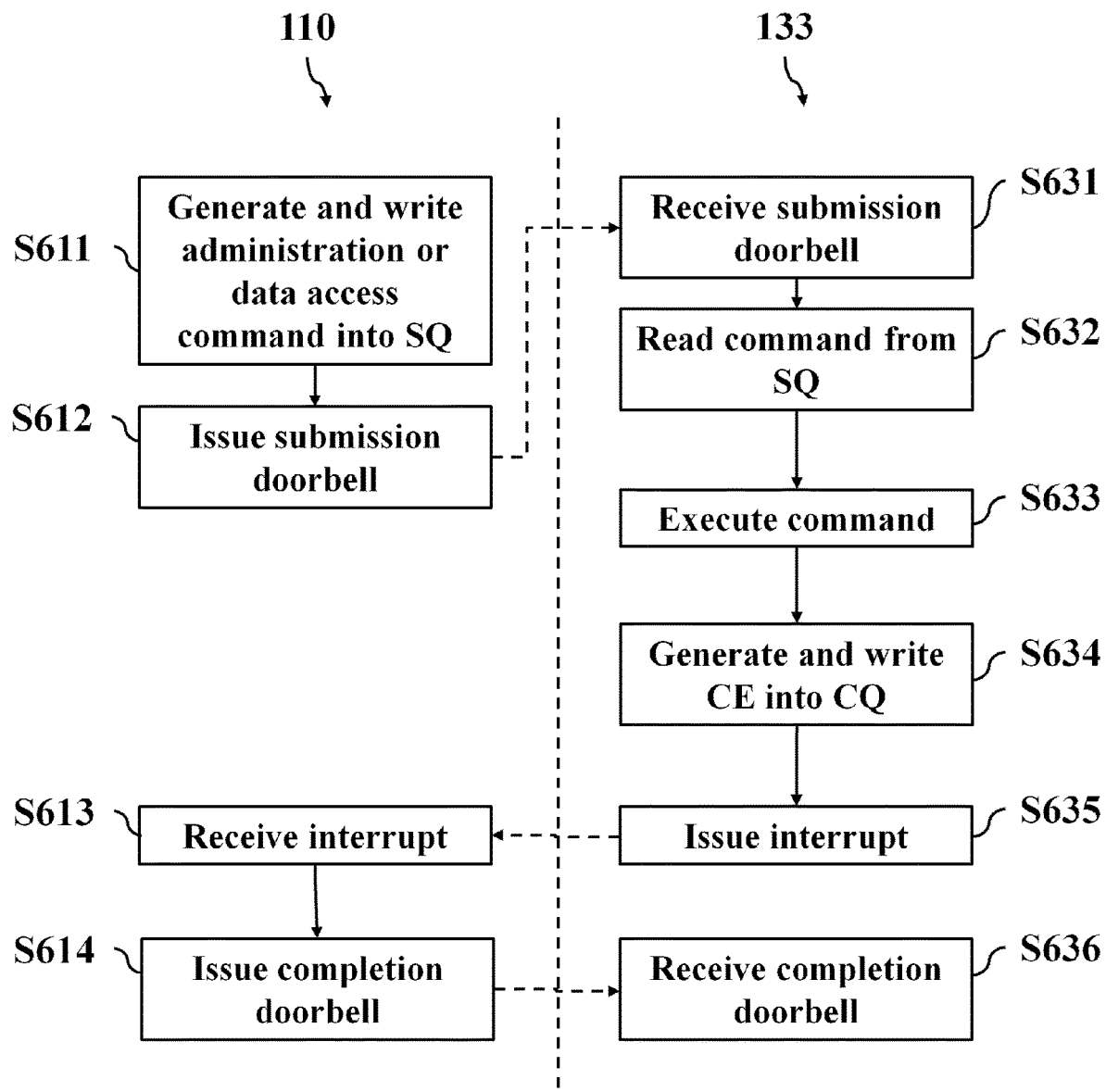
FIG. 6 is a flowchart illustrating execution steps for a management or data access command.

Refer to FIG. 6. The host 110 may generate and write an administration or data access command into the SQ 510 (step S611). Then, the host 110 may issue a submission doorbell to the processing unit 133 (step S612) to inform the processing unit 133 that an administration or data access command has been written into the SQ 510, and update the value (pointer) pointing to the tail of the SQ 510. Note that steps S611 and S612 may be referred to as an operation for issuing, by the host 110, an administration or data access command to the storage device 130. After receiving the submission doorbell (step S631), the processing unit 133 may read the administration or data access command from the head of the SQ 510 (step S632) and perform a designated operation (such as an identify, a parameter setting, a namespace management, a namespace attach, an erase, a data write, etc.) according to the administration or data access command (step S633).

Note that steps S631 and S632 may be referred to as an operation for receiving, by the storage device 130, an administration or data access command from the host 110. After the designated operation has been performed completed, the processing unit 133 may generate and write a CE into the CQ 530 (step S634) to inform the host 110 of information about an execution status for the operation associated with the administration or data access command, and issue an interrupt to the host 110 (step S635). After detecting the interrupt (step S613), the host 110 may read the CE from the head of the CQ 530 (step S613), and then, issue a completion doorbell to the processing unit 133 (step S614). After receiving the completion doorbell (step S636), the processing unit 133 may update the value pointing to the head of the CQ 530. Note that steps S634 and S635 may be referred to as an operation for replying, by the storage device 130, with a result for executing an administration or data access command to the host 110. Note that steps S613 and S614 may be referred to as an operation for receiving, by the host 110, a result for executing an administration or data access command from the storage device 130.

In steps S612 and S614, the host 110 may set corresponding registers to issue the submission and completion doorbells to the processing unit 133.

Figure 7:
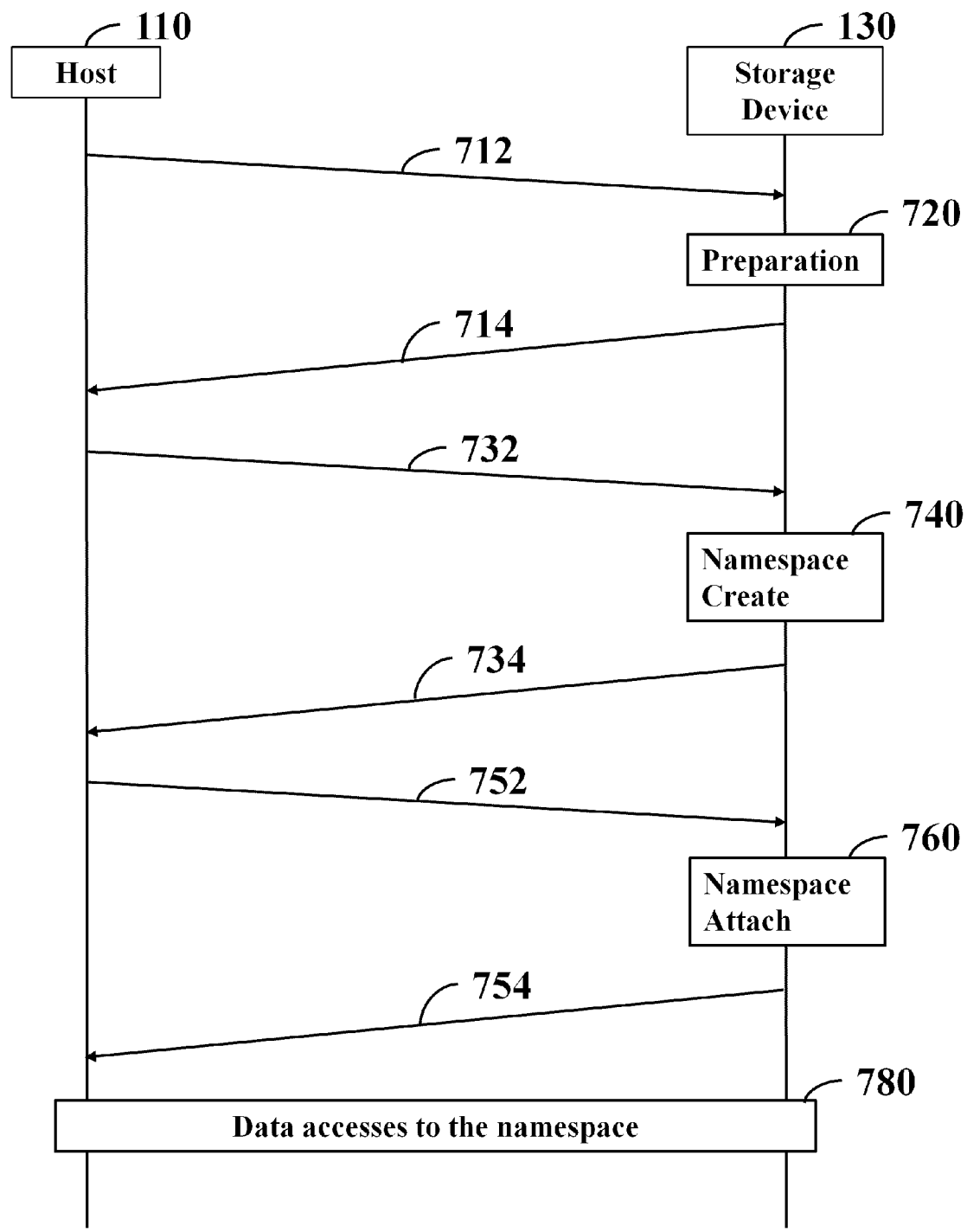
FIG. 7 is a sequence diagram for a namespace create and attach.

Refer to FIG. 7. After the storage device 130 connects to the host 110 and performs an initiation completely, the host 110 may issue an identify command 712 to the storage device 130. After the storage device 130 completely performs a preparation operation 720, the host may receive an execution result 714 from the storage device 130. The identify command 712 may be a controller identify command for requesting a controller data structure describing controller capabilities and features, such as Peripheral Component Interconnect (PCI) vendor ID, serial number, firmware revision, maximum data transfer size, controller ID fields, etc. The controller data structure may further describe Admin command set attributes and optional controller capabilities, such as Optional Admin Command Support (OACS) field, etc. The OACS field may specify whether the controller supports the namespace management and namespace attach commands.

In addition to the controller identify command, the identify command 712 may be a common namespace identify command for requesting a namespace data structure describing, for example, namespace size (NSZE), namespace capacity (NCAP) fields, etc. The $10^{th}$ byte of the $10^{th}$ double word (DW) of the identify command 712 may be used to distinguish whether the requested object is a controller or common namespace data structure.

In the preparation operation 720, the processing unit 133 may read necessary information for the controller and namespace data structures from a read only memory (not shown in FIG. 1) or the storage device 139 and upload the content of the controller and namespace data structures to an address of the RAM 120 designated by the identify command 712, thereby enabling the host 110 to read therefrom.

Then, the host 110 may take the content of the controller and namespace data structures as a reference and issue a namespace management command 732 to the storage device 130 to create a new namespace. The host 110 may allocate 4K bytes of the RAM 120 for storing the content of the namespace data structure to be created, in which the $0^{th}$ to $383^{rd}$ bytes define a identify namespace field. For example, the $0^{th}$ to $7^{th}$ bytes define a namespace size field storing a value "0x0FFFFFF" and the $8^{th}$ to $15^{th}$ bytes define a namespace capacity field storing a value "0x0FFFFFF". To create a new namespace, the host 110 may indicate this is a create operation (such as in the $0^{th}$ to $3^{rd}$ bytes of the $10^{th}$ DW) and provide a storage address (memory address) pointing to the content of the namespace data structure (such as in the $6^{th}$ to $7^{th}$ DWs or the $6^{th}$ to 9th DWs) by information carried in the namespace management command 732.

In a namespace create operation 740, the processing unit 133 may assign a namespace identifier (NSID), for example "0x00", from available ones to the requested namespace, and store values of a namespace size and a namespace capacity in the RAM 131 and/or the storage device 139. After the storage device 130 performs the namespace #0 create operation 740 successfully, the host 110 may receive an execution result 734 from the storage device 130, including the NSID assigned by the storage device 130 and information about a namespace #0 create success.

In alternative embodiments, the host 110 may issues an namespace management command 732 including a NSID, for example "0x00", thereby enabling the storage device 130 to create the namespace #0 according to the namespace management command 732 during the namespace create operation 740.

After the namespace #0 is successfully created, the host 110 may issue a namespace attach command 752 to the storage device 130 to attach the namespace #0 to one controller or more. The host 110 may fill the $0^{th}$ to $3^{rd}$ bytes of the $10^{th}$ DW to indicate that this command requests a controller attach operation. After the storage device 130 performs a namespace attach operation 760 successfully, the host 110 may receive an execution result 754 including information about a namespace #0 attach success from the storage device 130.

After the namespace #0 is successfully created and attached to a controller, the host 110 performs data accesses 780 to the namespace #0, for example, reading user data from designated LBA(s), writing user data into designated LBA(s) of the namespace #0, and so on.

Figure 8:
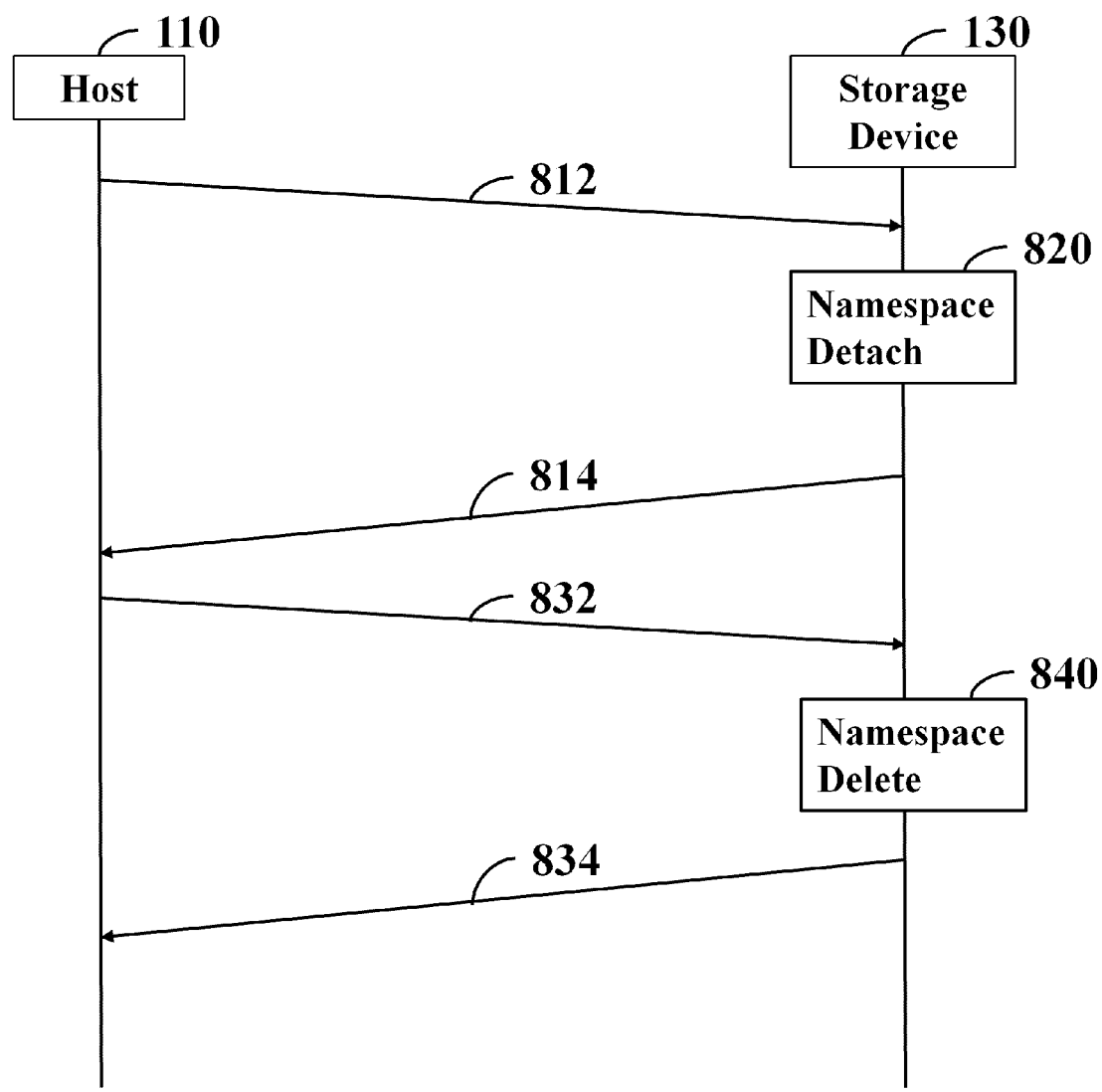
FIG. 8 is a sequence diagram for a namespace detachment and deletion.

Refer to FIG. 8. The host 110 may issue a namespace detach command 812 to the storage device 130 for detaching the namespace #0 from a particular controller. The host 110 may fill the $0^{th}$ to $3^{rd}$ bytes of the $10^{th}$ DW to indicate that this command requests a controller detach operation. After the storage device 130 performs a namespace detach operation 820 successfully, the host 110 may receive an execution result 814 including information about a namespace #0 detach success from the storage device 130.

After the namespace #0 has been detached from all controllers successfully, the host 110 may issue a namespace management command 832 to the storage device 130 for deleting the namespace #0. The host 110 may specify that the namespace management command 832 is a delete operation (such as the $0^{th}$ to $3^{rd}$ bytes of the $10^{th}$ DW) and provide a namespace identity of the namespace to be deleted (such as the $1^{st}$ DW), for example, the value "0x00" corresponding to the namespace #0. After a namespace #0 delete operation 840 has been performed successfully, the host 110 may receive an execution result 834 including information about a namespace #0 delete success from the storage device 130.

However, after a namespace has been created and attached, conventionally, no mechanism can be used to adjust the size or capacity of this namespace, resulting that the host 110 cannot expand the size or capacity of this namespace. For example, although the storage device 130 has available space of 1 TB and the namespace #0 size or capacity claims 64 GB only, the host 110 cannot expand the namespace #0 size or capacity from 64 GB to 128 GB. To address the limitations, embodiments of the invention introduce a mechanism for updating namespace settings to allow the host 110 to expand a namespace size or capacity.

Figure 9:
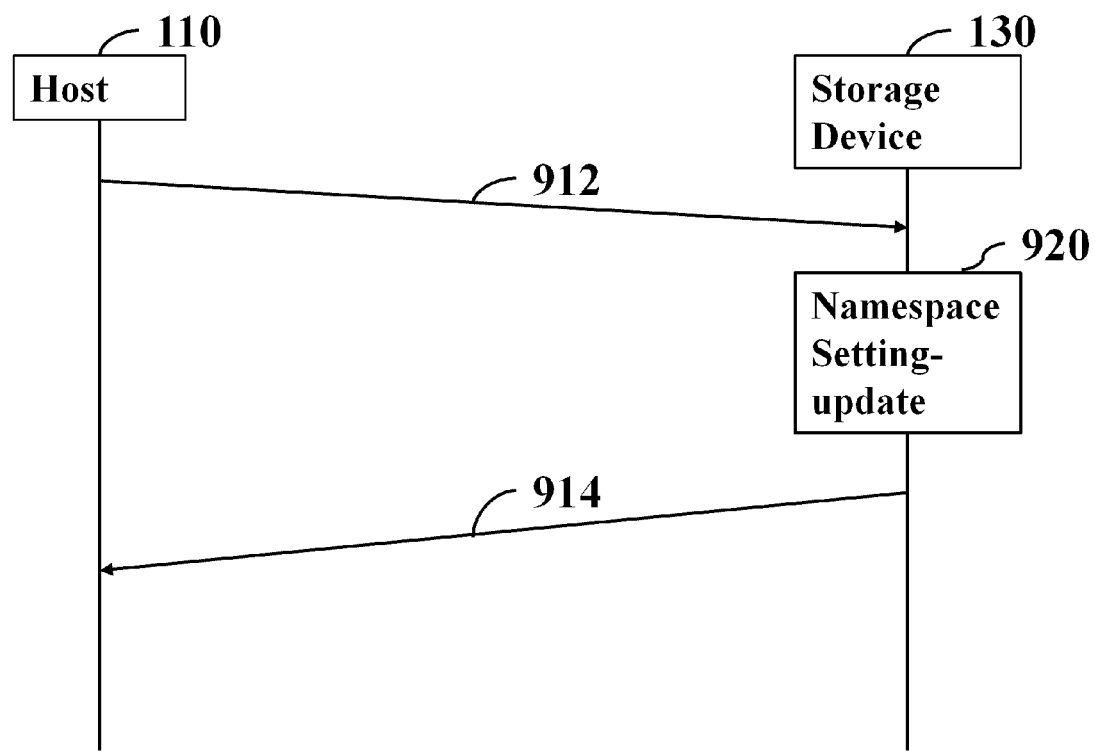
FIG. 9 is a sequence diagram for a namespace setting update according to an embodiment of the invention.

Refer to FIG. 9. Taking the namespace #0 as an example, after the namespace #0 has been created and attached, the host 110 may issue a namespace setting-update command 912 to the storage device 130 to request for expanding the namespace #0 size or capacity. In addition to the namespace setting-update command 912, the host 110 may allocate 4K bytes of the RAM 120 for storing the content of updated data structure for the namespace #0, in which the $0^{th}$ to $383^{th}$ bytes define a namespace, for example, the $0^{th}$ to $7^{th}$ bytes define a namespace size field that can be filled with an updated namespace size value, such as "0x1FFFFF" in logical blocks. The 8$^{th}$ to 15$^{th}$ bytes define a namespace capacity field that can be filled with an updated namespace capacity value, such as "0x1FFFFFF" in logical blocks. Regularly, the namespace size is equal to the namespace capacity. But, when the host 110 needs to allocate space of over provision as a buffer for data movements or other operations, the updated namespace capacity value, such as "0x1FFFF00", is smaller than the updated namespace size value. In some embodiments, except for the namespace size and capacity fields, the remaining bytes of the updated namespace data structure may be set to a dummy value (such as "0x00", "0xFF" or other preset values), thereby enabling the storage device 130 to ignore the dummy values.

Figure 10:
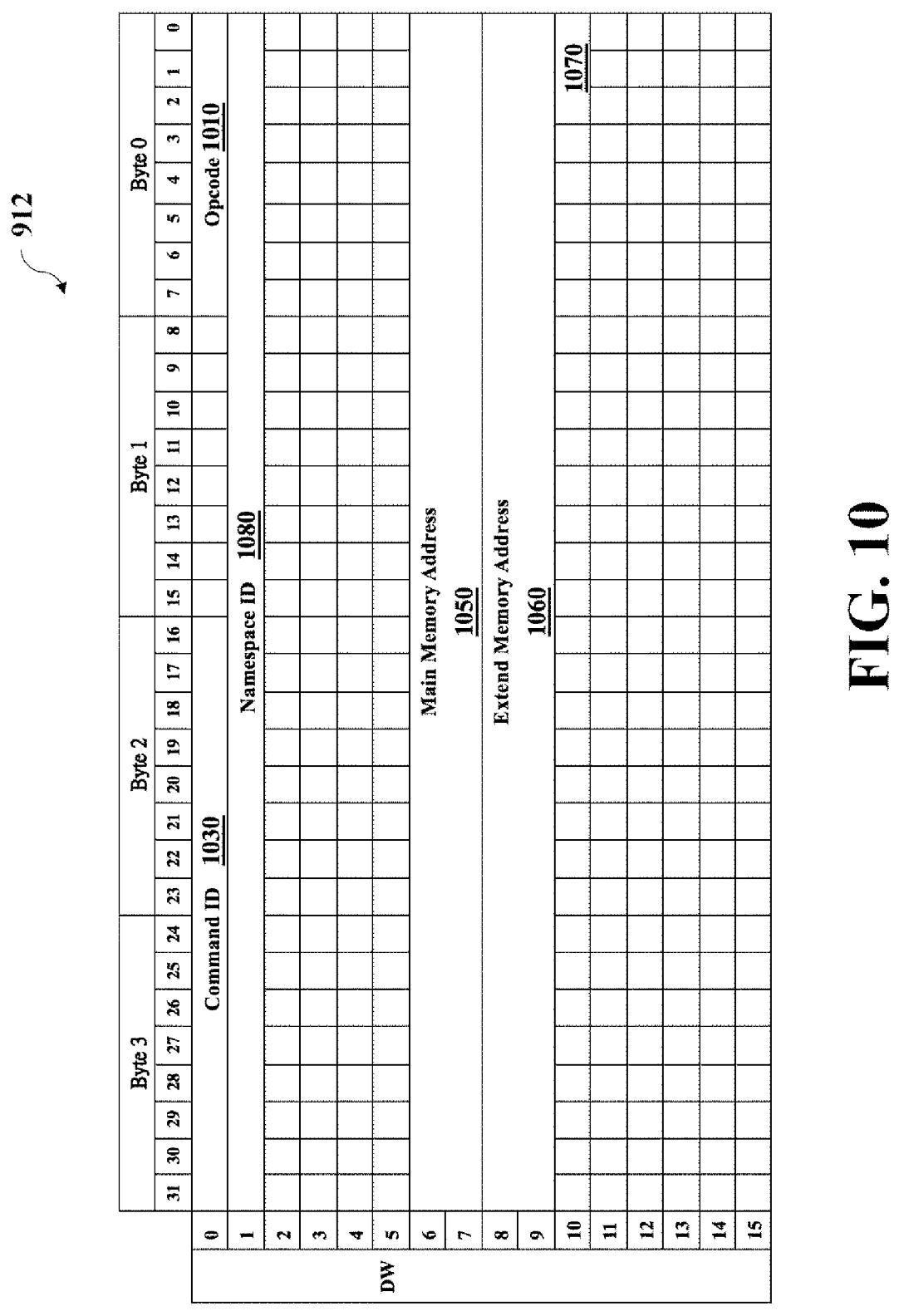

The format of the namespace setting-update command 912 is shown in FIG. 10. The namespace setting-update command 912 is a 64-byte command. The 0$^{th}$ byte of the 0$^{th}$ DW records an opcode 1010 for informing the storage device 130 of a namespace management command. The 2$^{nd}$ to 3$^{rd}$ bytes of the 0$^{th}$ DW records a command identity (ID) 1030 that is preferably a serial number for distinguishing one namespace setting-update command from the others. By the command ID 1030 one completion element (CE) of the CQ 530 is associated with a designated namespace setting-update command. The 1$^{st}$ DW records the ID "0x00" 1080 of the namespace #0 to be updated. The host 110 may fill a select field 1070 of the 0$^{th}$ to 3$^{rd}$ bytes of the 10$^{th}$ DW to indicate that is an update operation. The host 110 may provide a memory address pointing to a start of the updated namespace data structure of the RAM 120 in a main memory address field 1050 of the 6$^{th}$ to 7$^{th}$ DW, or the main memory address field 1050 and an extend memory address field 1060 of the 6$^{th}$ to 9$^{th}$ DW, enabling the storage device 130 to obtain the updated namespace size and capacity from the RAM 120 according to the memory address.

Although the above describes that the host 110 employs the RAM 120 to store the updated namespace size or capacity that is accessed by the storage device 130, in alternative embodiments, the host 110 may provide information about the updated namespace size or capacity value in the namespace setting-update command 912 directly, so as to avoid space occupation of the RAM 120, save a transmission bandwidth between the host 110 and the storage device 130 and accelerate an execution of the namespace setting-update command 912. For example, the updated namespace size value is carried in the main memory address field 1050 and/or the updated namespace capacity value is carried in the extend memory address field 1060.

In alternative embodiments, the opcode 1010 is used to indicate that is the namespace setting-update command 912 and the select field 1070 may be reserved from being used.

Moreover, before the namespace management command 912 is issued to the storage device 130, the host 110 may issue a identify command 712 to the storage device 130 for obtaining the original data structure of the namespace #0 and generate updated data structure by adjusting necessary parameters of the obtained one, including: the namespace size or capacity value. Moreover, the host 110 may issue a common namespace identity command for obtaining and treating a common namespace size or capacity value as the maximum quantity of logical blocks. Thereafter, an unallocated quantity of logical blocks is obtained by subtracting namespace size or capacity values of all created namespaces from the maximum quantity of logical blocks. Therefore, the updated namespace size or capacity value of the namespace #0 may be generated by adding a value equal to or less than the unallocated quantity of logical blocks to the original one.

Figure 11:
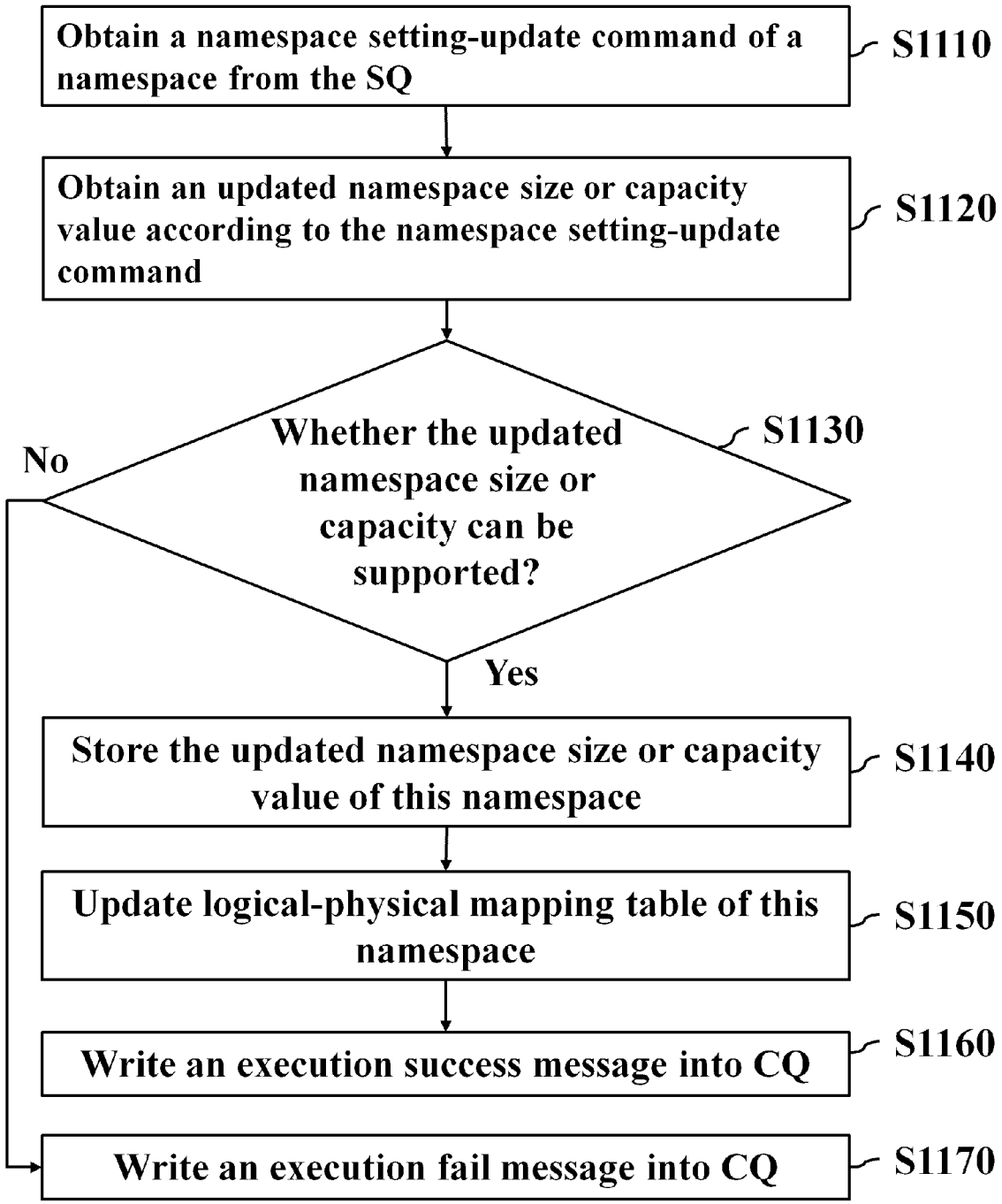
FIG. 11 is a flowchart illustrating a method for updating namespace settings according to an embodiment of the invention.

A namespace setting-update operation 920 is performed by the processing unit 133 preferably with a higher priority. Detailed operations may be described as follows: Refer to FIG. 11. The processing unit 133 may obtain a namespace setting-update command 912 of a namespace from the SQ 510 (step S1110) and obtain an updated namespace size or capacity value according to the namespace setting-update command 912 (step S1120). The updated namespace size or capacity value may be obtained from the content of the namespace setting-update command 912 or the data structure stored in a designated memory address carried in the namespace setting-update command 912.

Next, the processing unit 133 determines whether the updated namespace size or capacity can be supported (step S1130). The processing unit 133 may add the updated namespace size or capacity value to a summation of namespace size or capacity values of the other namespaces and determine whether the addition result exceeds the maximum quantity of logical blocks. Or, the processing unit 133 may determine whether the difference between the updated namespace size or capacity value and the original one is smaller than the unallocated quantity of logical blocks. It is determined that the updated namespace size or capacity value can be supported when the updated one plus the summation of namespace size or capacity values of the other namespaces does not exceed the maximum quantity of logical blocks or the difference between the updated namespace size or capacity value and the original one is smaller than the unallocated quantity of logical blocks.

When determining that the updated namespace size or capacity cannot be supported (the "No" path of step S1130), the processing unit 133 write a CE including an execution fail message into the CQ 530 (step S1170). Otherwise (the "Yes" path of step S1130), the processing unit 133 may store the updated namespace size or capacity value of this namespace in the RAM 131 and/or the storage unit 139 (step S1140).

The processing unit 133 updates a logical-physical mapping table of this namespace (step S1150). Regularly, since the logical-physical mapping table may be segmented into multiple logical-physical mapping sub-tables, the processing unit 133 may update the logical-physical mapping table by modifying the quantity of the logical-physical mapping sub-tables. Or, for reflecting the updated namespace size or capacity value, the processing unit 133 may create new logical-physical mapping sub-tables in advance. Or, the processing unit 133 may create a new logical-physical mapping sub-table on demand subsequent to the update of the namespace size or capacity value. The processing unit 133 writes a CE including an execution success message into the CQ 530 (step S1160).

Figure 12:
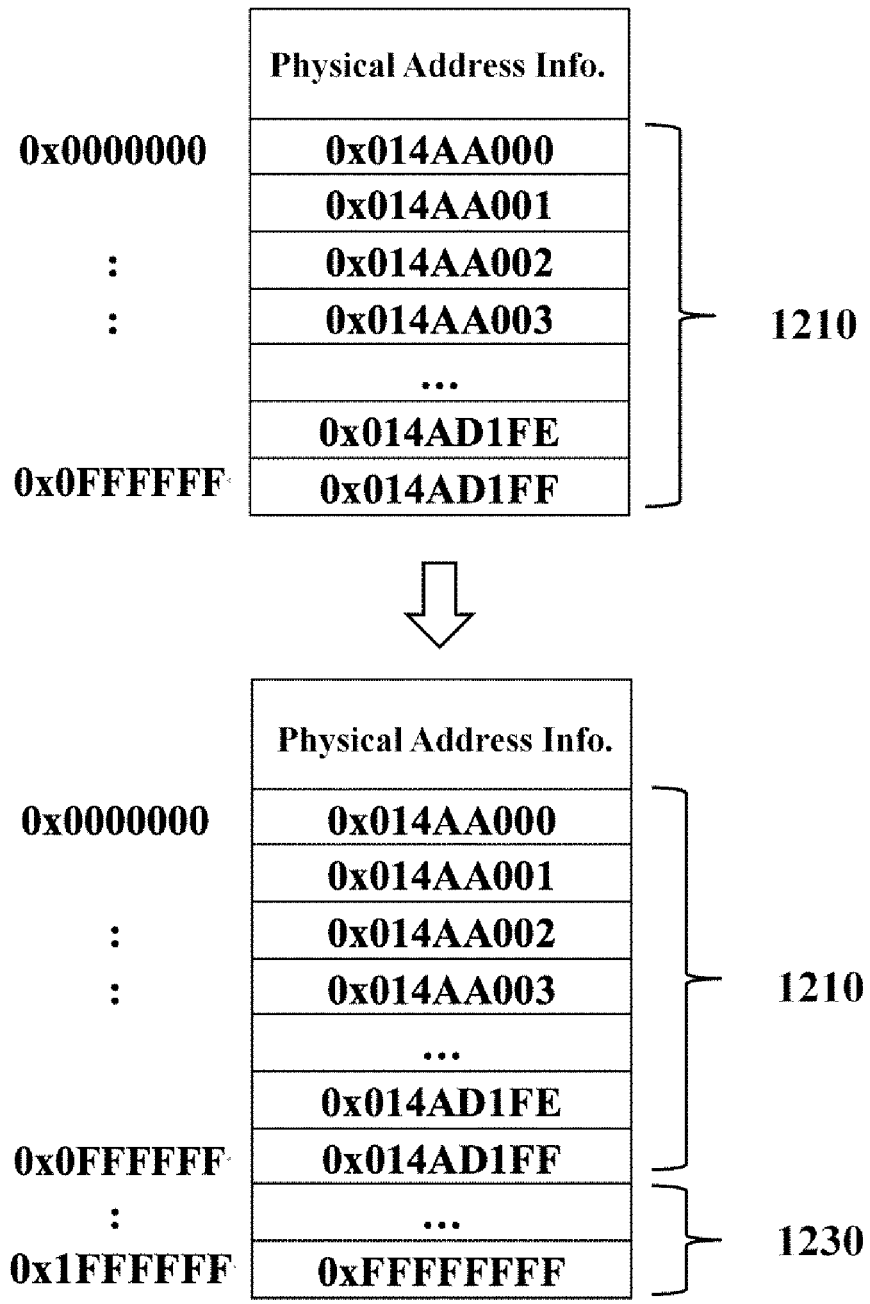
FIG. 12 is schematic diagram for expanding a logical-physical mapping table according to an embodiment of the invention.

Refer to FIG. 12. Assume that the original namespace size or capacity is 64 GB: The processing unit 133 creates a logical-physical mapping table 1210 for storing mapping information between logical block addresses "0x0000000" to "0x0FFFFFF" and physical addresses to manage 64 GB user data. When the storage device 130 receives a request of the namespace setting-update command 912 issued by the host 110, the processing unit 133 may append a new logical-physical mapping table 1230 to the original one 1210, so that the logical block addresses are expanded to "0x1FFFFFF" from "0x0FFFFFF" for managing 128 GB user data. The physical address of each entry may be filled with dummy values (such as "0x00000000", "0xFFFFFFFF" or others) in advance. Or, the logical-physical mapping 1230 is created for the first time that the host 110 accesses user data of a logical block address ranging from "0x1000000" to "0x1FFFFFF".

Moreover, no conventional mechanism can be used to facilitate user data movements across namespaces. For example, when moving user data from the namespace #0 to the namespace #1, the host needs to issue a series of read commands of the namespace #0 to the storage device 130 for reading and storing user data in a data buffer of the RAM 120, and subsequently, issue a series of deallocate commands of the namespace #0 to the storage device 130 to delete the user data. Thereafter, the host 110 issue a series of write commands of the namespace #1 to the storage device 130 for writing the user data of the data buffer into a storage unit of the namespace #1. However, it consumes excessive space of queues for storing the aforementioned read, deallocate and write commands and their corresponding CEs, excessive bandwidth of the RAM 120 for transmitting the read data of the storage unit 139 and the user data to be programmed into the storage unit 139, and excessive space of the RAM 120 for temporarily storing the read data. Furthermore, the host 110 and the processing unit 133 also consume excessive computation capacities for dealing with the series of read, deallocate and write commands, resulting that the system performance of the storage device 130 is greatly degraded because the storage device 130 cannot offer sufficient computation resource for responding to the other data access commands issued by the host 110.

Figure 13:
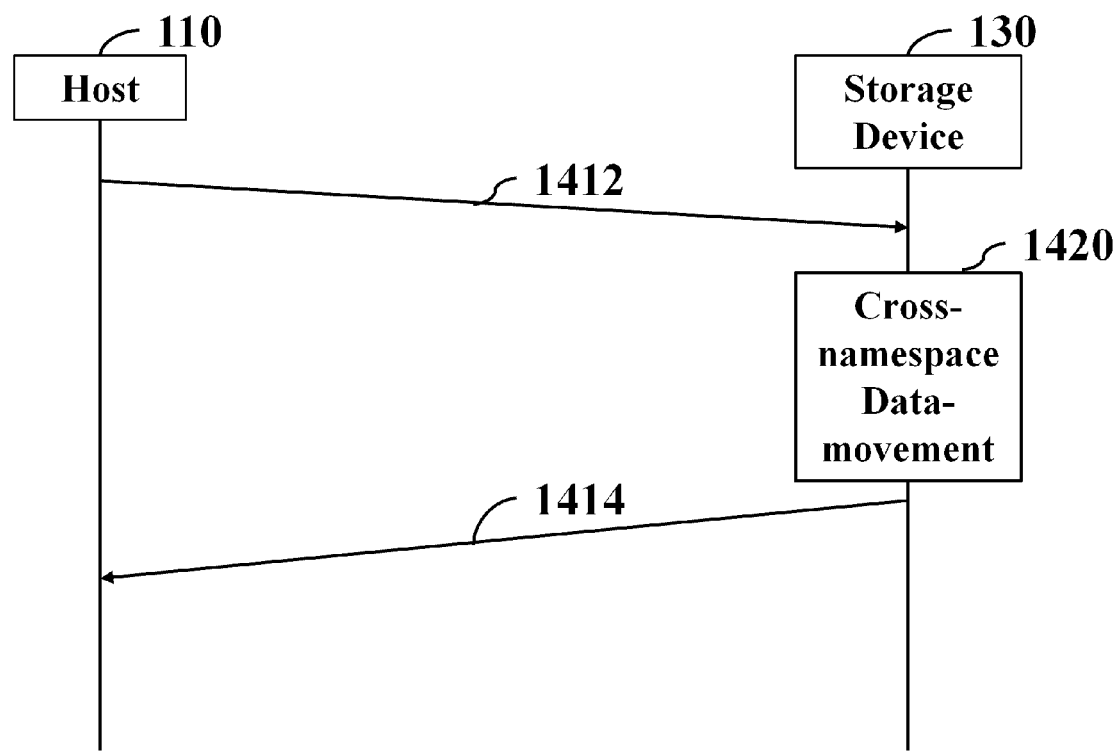
FIG. 13 is a sequence diagram for data movements across namespaces according to an embodiment of the invention.

To address the problems, refer to FIG. 13, after a namespace is created and attached to a controller, the host 110 may issue a cross-namespace data-movement command 1412 to the storage device 130 for instructing the storage device 130 to internally move user data of a source LBA of a source namespace, such as the namespace #0, to a destination LBA of a destination namespace, such as the namespace #1. The source LBA may be the same as or different from the destination LBA.

Refer to FIG. 14. The cross-namespace data-movement command 1412 is a 64-byte command. The $0^{th}$ byte of the $0^{th}$ DW records an opcode 1510 for informing the storage device 130 of a cross-namespace data-movement command. The $2^{nd}$ to $3^{rd}$ bytes of the $0^{th}$ DW records a command ID 1530 that is preferably a serial number for distinguishing one cross-namespace data-movement command from the others. By the command ID 1530 one CE of the CQ 530 is associated with a designated cross-namespace data-movement command. The $1^{st}$ DW records a destination namespace ID 1580 and the $6^{th}$ to $7^{th}$ DWs record a start destination logical-block-number 1550. The $2^{nd}$ DW records a source namespace ID 1590 and the $10^{th}$ to $11^{th}$ DWs record a start source logical-block-number 1560. The $0^{th}$ to $1^{st}$ bytes of the $12^{th}$ DW record a data-movement quantity 1570. The start source logical-block-number 1560 and the data-movement quantity 1570 define successive LBAs of the source namespace. The start destination logical-block-number 1550 and the data-movement quantity 1570 define successive LBAs of the destination namespace.

Figure 15:
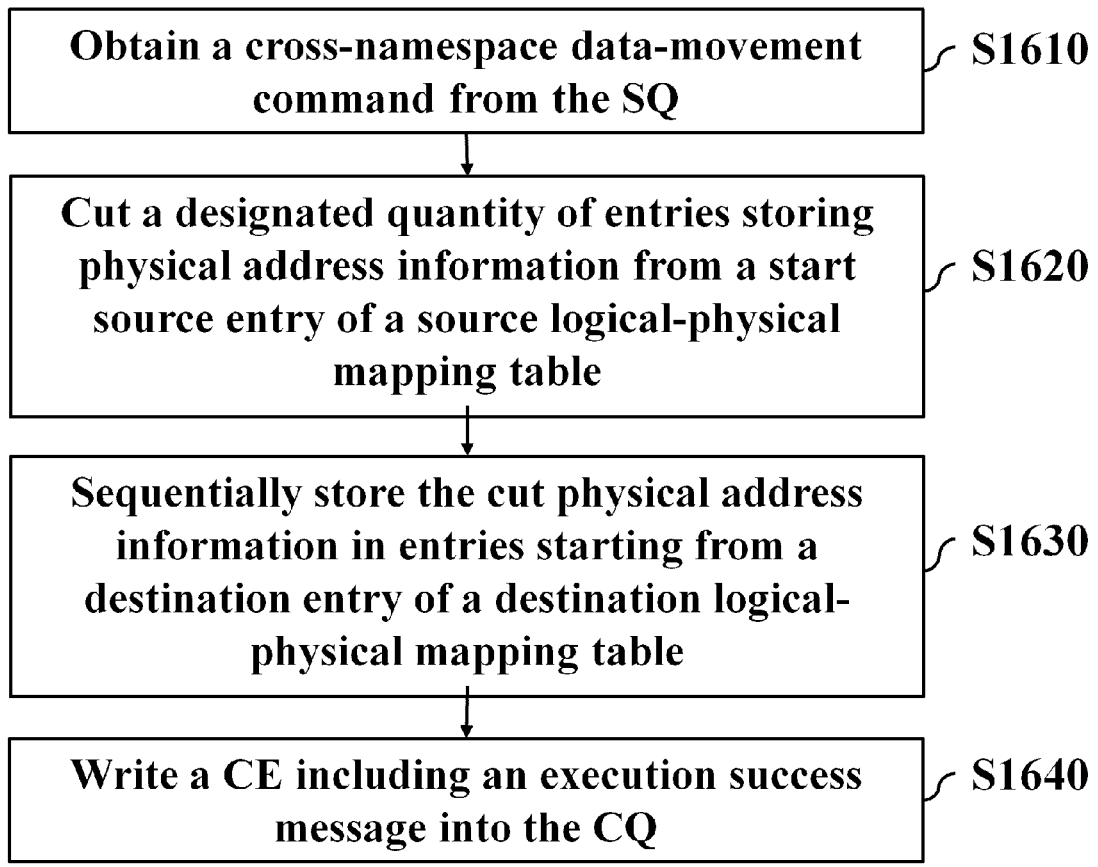
FIG. 15 is a flowchart illustrating a method for moving data across namespaces according to an embodiment of the invention.
Figure 16:
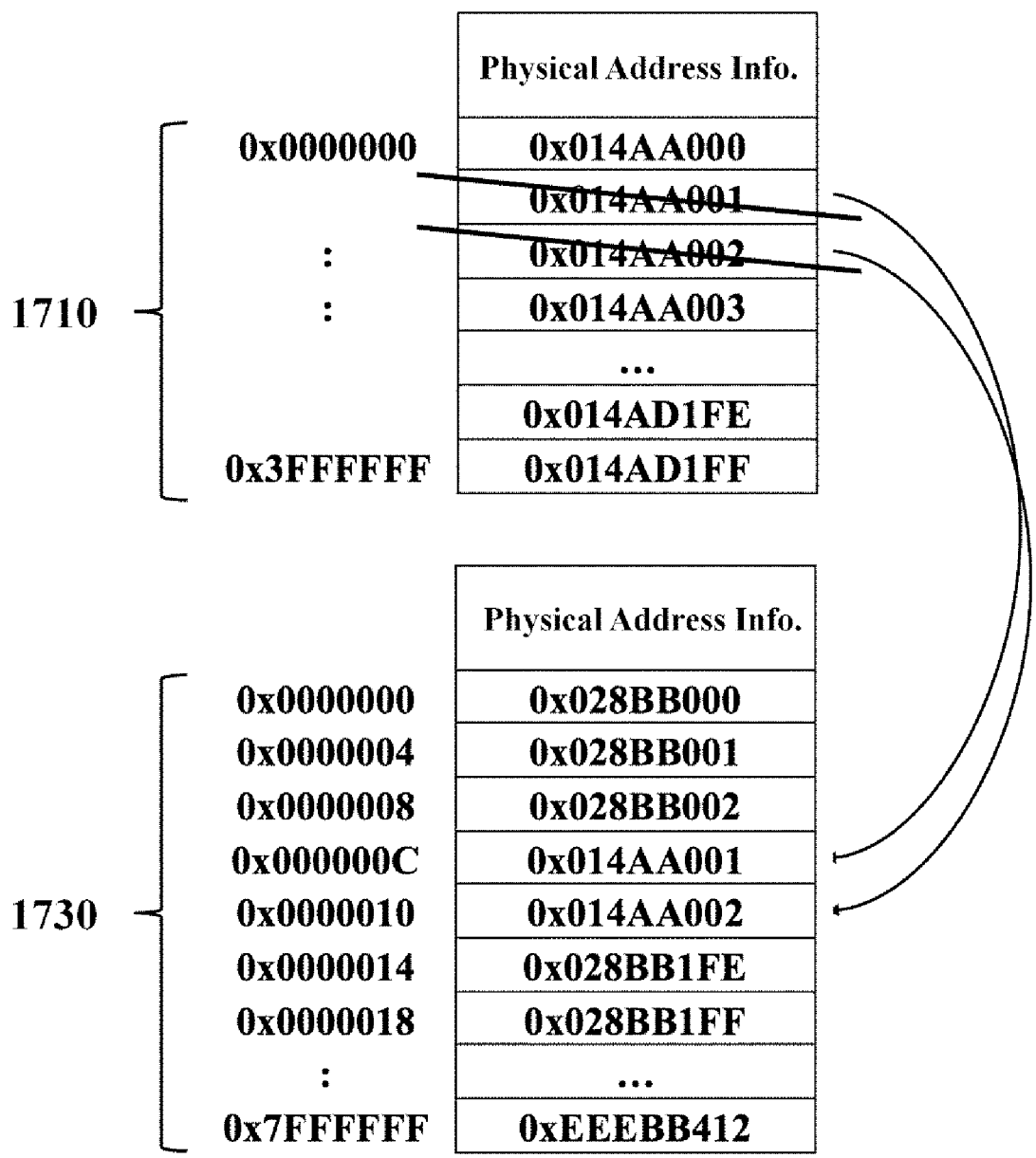
FIG. 16 is a schematic diagram for moving physical address information across logical-physical mapping tables of different namespaces according to an embodiment of the invention.

Details of the cross-namespace data-movement operation 1420 are described as follows: Refer to FIG. 15. The cross-namespace data-movement operation 1420 may be performed by the processing unit 133 when loading and executing relevant firmware instructions. The processing unit 133 may obtain a cross-namespace data-movement command 1412 from the SQ 510, which requests for moving user data of designated LBAs of a source namespace to storage space of designated LBAs of a destination namespace (step S1610). Next, the processing unit 133 may cut (or duplicate and then deallocate) a designated quantity of entries storing physical address information from a start source entry (i.e. an entry indicated by the start source logical-block-number 1560) of a source logical-physical mapping table (i.e. a logical-physical mapping table corresponding to the source namespace ID 1590) (step S1620) and sequentially store the cut physical address information in entries starting from a destination entry (i.e. an entry indicated by the start destination logical-block-number 1550) of a destination logical-physical mapping table (i.e. a logical-physical mapping table corresponding to the destination namespace ID 1580) (step S1630). Before step S1620, the processing unit 133 may drive the flash controller 135 to read corresponding portions of the source and destination logical-physical mapping tables and store them in the RAM 131. The cut and the paste recited in steps S1620 and S1630 may indicate data updates of the RAM 131. After step S1630, the processing unit 133 may drive the flash controller 135 to program the updated portions of the source and destination logical-physical mapping tables into the storage unit 139. At last, the processing unit 133 may write a CE including an execution success message into the CQ 530 (step S1640). The flowchart illustrated in FIG. 16 does not involve any actual movements of user data, and therefore, the problems are addressed or alleviated.

For example, the host 110 may create two namespaces for storing confidential and unclassified data, which are referred to as a confidential namespace and a public namespace, respectively. Privileges and conditions for accessing the confidential namespace may be preferably set by the host 110. For example, the host 110 may allow user accounts of a classified group only to access user data of the confidential namespace while all legal user accounts are allowed to access user data of the public namespace. When certain confidential data is changed to unclassified, the host 110 may need to move that from the confidential namespace to the public namespace. The application may employ the aforementioned mechanism for moving data across namespaces. Refer to FIG. 17. Suppose that a cross-namespace data-movement command requests to change the user data of LBA #1~#2 of the namespace #0 as that of LBA #3~#4 of the namespace #1. The processing unit 133 cuts physical address information recorded in the $1^{st}$ to $2^{nd}$ entries of a logical-physical mapping table 1710 (corresponding to the namespace #0) and store the cut one in the $3^{rd}$ to $4^{th}$ entries of a logical-physical mapping table 1730 (corresponding to the namespace #1).

Some or all of the aforementioned embodiments of the method of the invention may be implemented in a computer program such as an operating system for a computer, a driver for a dedicated hardware of a computer, or a software application program. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

The computer program may be advantageously stored on computation equipment, such as a computer, a notebook computer, a tablet PC, a mobile phone, a digital camera, a consumer electronic equipment, or others, such that the user of the computation equipment benefits from the aforementioned embodiments of methods implemented by the computer program when running on the computation equipment. Such the computation equipment may be connected to peripheral devices for registering user actions such as a computer mouse, a keyboard, a touch-sensitive screen or pad and so on.

Although the embodiment has been described as having specific elements in FIG. 1, it should be noted that additional elements may be included to achieve better performance without departing from the spirit of the invention. Each element of FIG. 1 is composed of various circuits and arranged to operably perform the aforementioned operations. While the process flows described in FIGS. 11 and 15 includes a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for performing operations to namespaces of a flash memory device, by a processing unit of a storage device, comprising:
   providing a first logical-physical mapping table corresponding to a first namespace, wherein the first logical-physical mapping table stores physical information corresponding to logical addresses in the first namespace;
   providing a second logical-physical mapping table corresponding to a second namespace, wherein the second logical-physical mapping table stores physical information corresponding to logical addresses in the second namespace;
   receiving a cross-namespace data-movement command from a host, requesting to move user data of a first logical address of the first namespace to a second logical address of the second namespace in a storage unit of the storage device, wherein the user data of the first logical address of the first namespace is stored in a physical address of the storage unit; and
   in response to the cross-namespace data-movement command, ignoring original intention of the cross-namespace data-movement command for an actual data movement from the first namespace to the second namespace, deleting physical address information corresponding to the first logical address from the first logical-physical mapping table corresponding to the first namespace, and storing the physical address information in an entry corresponding to the second logical address in the second logical-physical mapping table corresponding to the second namespace, wherein the physical address information describes the physical address of the storage unit that stores the user data, and the user data stored in the physical address of the storage unit remains.

2. The method of claim 1, wherein the first logical address indicates first successive logical block addresses (LBAs) and the second logical address indicates second successive LBAs.

3. The method of claim 1, wherein the cross-namespace data-movement command comprises a first namespace identity (ID), a second namespace ID, a first logical block number, a second logical block number and a movement quantity, the first namespace ID represents the first namespace, the second namespace ID represents the second namespace, the first logical block number and the movement quantity define the first logical address and the second logical block number and the movement quantity define the second logical address.

4. The method of claim 1, wherein the first namespace is a confidential namespace and the second namespace is a public namespace, and user data of the confidential namespace is allowed to be accessed by user accounts of a classified group and user data of the public namespace is allowed to be accessed by legal user accounts.

5. The method of claim 1, wherein the first namespace is a public namespace and a second namespace is a confidential namespace, and user data of the confidential namespace is allowed to be accessed by user accounts of a classified group and user data of the public namespace is allowed to be accessed by legal user accounts.

6. A non-transitory computer-readable storage medium for performing operations to namespaces of a flash memory device when executed by a processing unit of a storage device, the non-transitory computer-readable storage medium comprising program code to:
   provide a first logical-physical mapping table corresponding to a first namespace, wherein the first logical-physical mapping table stores physical information corresponding to logical addresses in the first namespace;
   provide a second logical-physical mapping table corresponding to a second namespace, wherein the second logical-physical mapping table stores physical information corresponding to logical addresses in the second namespace;
   receive a cross-namespace data-movement command from a host, requesting to move user data of a first logical address of the first namespace to a second logical address of the second namespace in a storage unit of the storage device, wherein the user data of the first logical address of the first namespace is stored in a physical address of the storage unit; and
   in response to the cross-namespace data-movement command, ignore original intention of the cross-namespace data-movement command for an actual data movement from the first namespace to the second namespace, delete physical address information corresponding to the first logical address from the first logical-physical mapping table corresponding to the first namespace, and store the physical address information in an entry corresponding to the second logical address in the second logical-physical mapping table corresponding to the second namespace, wherein the physical address information describes the physical address of the storage unit that stores the user data, and the user data stored in the physical address of the storage unit remains.

7. The non-transitory computer-readable storage medium of claim 6, wherein the first logical address indicates first successive logical block addresses (LBAs) and the second logical address indicates second successive LBAs.

8. The non-transitory computer-readable storage medium of claim 6, wherein the cross-namespace data-movement command comprises a first namespace identity (ID), a second namespace ID, a first logical block number, a second logical block number and a movement quantity, the first namespace ID represents the first namespace, the second namespace ID represents the second namespace, the first logical block number and the movement quantity define the first logical address and the second logical block number and the movement quantity define the second logical address.

9. The non-transitory computer-readable storage medium of claim 6, wherein the first namespace is a confidential namespace and the second namespace is a public namespace, and user data of the confidential namespace is allowed to be accessed by user accounts of a classified group and user data of the public namespace is allowed to be accessed by legal user accounts.

10. The non-transitory computer-readable storage medium of claim 6, wherein the first namespace is a public namespace and a second namespace is a confidential namespace, and user data of the confidential namespace is allowed to be accessed by user accounts of a classified group and user data of the public namespace is allowed to be accessed by legal user accounts.

11. The non-transitory computer-readable storage medium of claim 6, comprising program code to:
program an updated first logical-physical mapping table corresponding to the first namespace and an updated second logical-physical mapping table corresponding to the second namespace into a storage unit of the storage device.

12. An apparatus for performing operations to namespaces of a flash memory device, comprising:
a random access memory (RAM) arranged to operably store a first logical-physical mapping table corresponding to a first namespace, and a second logical-physical mapping table corresponding to a second namespace, wherein the first logical-physical mapping table stores physical information corresponding to logical addresses in the first namespace and the second logical-physical mapping table stores physical information corresponding to logical addresses in the second namespace;
an access interface, coupled to a storage unit; and
a processing unit coupled to the RAM and the access interface, and arranged to operably: receive a cross-namespace data-movement command from a host, requesting to move user data of a first logical address of the first namespace to a second logical address of the second namespace in the storage unit, wherein the user data of the first logical address of the first namespace is stored in a physical address of the storage unit; and in response to the cross-namespace data-movement command, ignore original intention of the cross-namespace data-movement command for an actual data movement from the first namespace to the second namespace, delete physical address information corresponding to the first logical address from the first logical-physical mapping table corresponding to the first namespace, and store the physical address information in an entry corresponding to the second logical address in a second logical-physical mapping table corresponding to the second namespace, wherein the physical address information describes the physical address of the storage unit that stores the user data, and the user data stored in the physical address of the storage unit remains.

13. The apparatus of claim 12, wherein the first logical address indicates first successive logical block addresses (LBAs) and the second logical address indicates second successive LBAs.

14. The apparatus of claim 12, wherein the cross-namespace data-movement command comprises a first namespace identity (ID), a second namespace ID, a first logical block number, a second logical block number and a movement quantity, the first namespace ID represents the first namespace, the second namespace ID represents the second namespace, the first logical block number and the movement quantity define the first logical address and the second logical block number and the movement quantity define the second logical address.

15. The apparatus of claim 12, wherein the first namespace is a confidential namespace and the second namespace is a public namespace, and user data of the confidential namespace is allowed to be accessed by user accounts of a classified group and user data of the public namespace is allowed to be accessed by legal user accounts.

16. The apparatus of claim 12, wherein the first namespace is a public namespace and a second namespace is a confidential namespace, and user data of the confidential namespace is allowed to be accessed by user accounts of a classified group and user data of the public namespace is allowed to be accessed by legal user accounts.

17. The apparatus of claim 12, wherein processing unit is arranged to operably drive the access interface to program an updated first logical-physical mapping table corresponding to the first namespace and an updated second logical-physical mapping table corresponding to the second namespace into the storage unit.

* * * * *